Oct. 28, 1930. C. J. TREMLETT 1,779,519
STARTING CRANK MECHANISM
Filed June 21, 1929
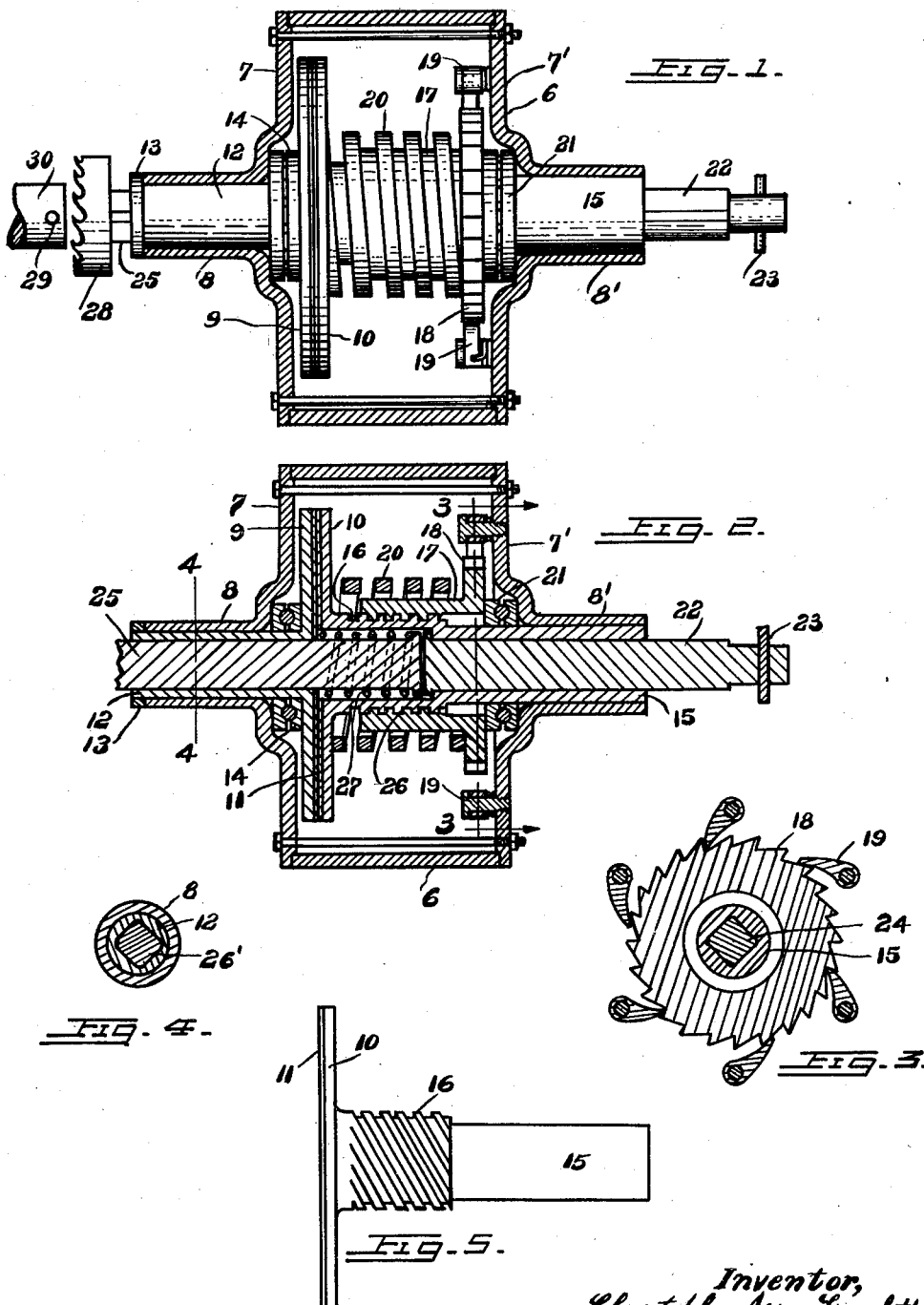

Patented Oct. 28, 1930

1,779,519

UNITED STATES PATENT OFFICE

CHRISTOPHER JESSE TREMLETT, OF TORONTO, ONTARIO, CANADA

STARTING-CRANK MECHANISM

Application filed June 21, 1929. Serial No. 372,648.

The invention relates to improvements in starting crank mechanisms as described in the present specification and shown in the accompanying drawings which form part of the same.

This invention is designed to be interposed between the ordinary starting crank and the crankshaft of an internal combustion engine for automobiles et cetera.

It has for its object the provision of a device that will automatically prevent the kick of an engine due to backfiring being transmitted to the starting crank so as to preclude injury to the party cranking the engine.

The invention mainly consists of a stationary casing comprising a pair of clutch members normally held in engagement by spring pressure, the driving member receiving its turning movement from the starting crank which it transmits through the other clutch member which communicates the motion to the crankshaft. This driving member has threaded engagement with the ratchet which is held against retrograde movement by pawls. In the event of a backfire, the ratchet serves to disengage the clutch members.

Referring to the drawings, Figure 1 is a longitudinal elevation of the invention depicting the casing in section.

Figure 2 is a longitudinally sectional view thereof.

Figure 3 is a cross-section of the ratchet and pawl mechanism taken on the line 3—3 of Figure 2.

Figure 4 is a cross section taken on the line 4—4 of the same figure.

Figure 5 is a detail of the driving clutch member.

Like numerals of reference indicate corresponding parts in each of the figures throughout the drawings.

In the drawings, the reference numeral 6 generally denotes a casing which may be of any suitable design for housing the various operating parts and comprises side plates 7, 7′, each having an integral hollow boss 8, 8′ respectively, which bosses are disposed in alignment with each other. The casing may be stationarily supported by the engine, or in the case of an engine of an automobile, it may be attached directly to the chassis in any suitable manner.

9 and 10 are the clutch members which are shown by way of illustration but not limitation as taking the form of clutch plates lined as at 11. It is to be distinctly understood that if so desired a cone clutch or any other known type of clutch may be used in place of the plate clutch shown in the drawings. The driven clutch member 9 has an integral sleeve 12 journalled in the boss 8 of the casing and secured by a collar 13. If so desired an anti-friction bearing 14 may be interposed between the side plate 7 and this clutch member in order to take the thrust.

The driving clutch member 10 is constructed integral with a comparatively long sleeve 15 journalled in the side plate 7′ and having a portion of its length threaded as at 16 and engaged with the threads of the boss 17 of the ratchet 18. These threads are right-handed and of a quick pitch such as obtained by a multiple thread. The ratchet 18 encircles the sleeve and is held against retrograde movement by circumposed pawls as at 19 which are spring-urged into engagement with the teeth of the ratchet and supported on the side plate 7′ of the casing.

A substantial coil-spring 20 functions to hold the clutch members in engagement with each other and has one of its ends seated against the clutch member 10, while the other end is seated against the ratchet 18 so as to normally turn as a unit therewith. If so desired an anti-friction bearing 21 may be interposed between the ratchet and the side plate 7′ in order to take the thrust from the spring. 22 is a stub shaft slidably mounted in the sleeve 15 of the clutch member 10 and held against withdrawal by means of a shoulder provided on its inner end, while on the other end is a pin 23 for connection to the usual starting crank, not shown. The shaft 22 is held against independent rotation in the sleeve by means of its squared section 24—Figure 3.

25 is a stub-shaft slidably mounted in the sleeve 12 of the driven clutch member 9 and provided with an annular shoulder 26 at its inner end. This shaft has a coil-spring 27 encircling its inner end and seated against a shoulder 26 in order to normally hold it in abutting engagement with the shaft 22. The shaft 25 is likewise of a square cross-section as shown at 26', Figure 4, in order to fit into the correspondingly shaped bore of the sleeve 12 to preclude its independent rotation therein. The outer end of this shaft is provided with a ratchet 28 designed for engagement with a pin 29 transversely extending from the end 30 of the crankshaft of the engine.

In the use of this invention the starting crank is fitted onto the outer end of the shaft 22 so as to engage the pin 23 and then pressed inwardly so as to force the shafts 22 and 25 towards the engine and overcome the pressure of the spring 27 in order to bring the ratchet 28 into engagement with the pin 29 of the crankshaft 30.

The starting crank is then turned in the ordinary manner and the turning movement is transmitted by the clutch members 9 and 10 to the shaft 25 and from there to the crankshaft of the engine. In the event of a backfire, however, the initial reverse movement of the crankshaft turns the driving clutch member 10 in the opposite direction and as the ratchet is held against retrograde movement by the pawls this clutch member is fed away from the other through its threaded connection, thus severing the driving connection and preventing the starting crank from being turned backwards.

What I claim is:—

1. A starting crank mechanism comprising a friction clutch driving member for connection to a starting crank, a friction clutch driven member for connection to a crankshaft of an engine, an externally threaded sleeve rotatable with said driving clutch member, a ratchet having a threaded bore engaged with the sleeve threads, means engaged with the ratchet teeth to prevent retrograde movement of the ratchet, and a spring normally holding the aforesaid clutch members in engagement with each other.

2. A starting crank mechanism comprising a driving clutch member for connection to a starting crank, a driven clutch member for connection to a crankshaft of an engine, an externally threaded sleeve rotatable with said driving clutch member, a ratchet having a threaded bore engaged with the sleeve threads, spring-urged pawls engaged with said ratchet, said pawls being stationarily mounted to prevent retrograde movement thereof, and a spring normally holding the aforesaid clutch members in engagement with each other.

3. A starting crank mechanism comprising a driving clutch member for connection to a starting crank, a driven clutch member for connection to a crankshaft of an engine, an externally threaded sleeve rotatable with said driving clutch member, a ratchet having a threaded bore engaged with the sleeve threads, means engaged with the ratchet teeth to prevent retrograde movement of the ratchet, and a compression coil-spring seated against the ratchet and the aforesaid driving clutch member to hold the latter in engagement with the driven clutch member.

4. A starting crank mechanism comprising a stationary casing, a clutch therein, a sleeve integral with the driven element of the clutch and journalled in the casing, a sleeve integral with the driving element and likewise journalled in the casing, a portion of the length of the latter sleeve being provided with an external thread of a quick pitch, a ratchet having a threaded boss engaged with the threaded sleeve, spring-urged pawls mounted on the casing and engaged with the ratchet to prevent retrograde movement, a compression spring having one end seated against said ratchet and the other end against the driving element of the aforesaid clutch, a shaft slidably mounted in the threaded sleeve and held against independent rotary movement therein, this shaft being adapted for connection to a starting crank, a shaft likewise fitted in the other sleeve, a spring holding this latter shaft in abutting engagement with the former shaft, and a ratchet secured on the latter shaft for detachable connection with a pin on the crankshaft of an engine.

Signed at Toronto, Ontario, this 7th day of June, 1929.

CHRISTOPHER JESSE TREMLETT.